United States Patent
Taniguchi et al.

(10) Patent No.: US 8,216,983 B2
(45) Date of Patent: Jul. 10, 2012

(54) GREASE COMPOSITION FOR USE IN CONSTANT VELOCITY JOINT AND CONSTANT VELOCITY JOINT

(75) Inventors: Akira Taniguchi, Fujisawa (JP); Shinya Kondo, Fujisawa (JP)

(73) Assignee: Kyodo Yushi Co., Ltd., Tokyo (JP)

( * ) Notice: Subject to any disclaimer, the term of this patent is extended or adjusted under 35 U.S.C. 154(b) by 0 days.

(21) Appl. No.: 11/509,575

(22) Filed: Aug. 25, 2006

(65) Prior Publication Data

US 2006/0281639 A1  Dec. 14, 2006

(30) Foreign Application Priority Data

Feb. 27, 2004  (JP) .................................. 2004-053735

(51) Int. Cl.
*C10M 169/04* (2006.01)
*C10M 125/10* (2006.01)
*C10M 133/20* (2006.01)
*C10M 135/18* (2006.01)

(52) U.S. Cl. ......................... 508/172; 508/363; 508/168

(58) Field of Classification Search .................. 508/168, 508/172, 363
See application file for complete search history.

(56) References Cited

U.S. PATENT DOCUMENTS

| | | | |
|---|---|---|---|
| 5,607,906 A | 3/1997 | Okaniwa | |
| 5,858,931 A | 1/1999 | Tanaka | |
| 6,268,316 B1 * | 7/2001 | Tanaka et al. | 508/291 |
| 6,329,327 B1 * | 12/2001 | Tanaka et al. | 508/362 |
| 6,432,889 B1 * | 8/2002 | Kinoshita et al. | 508/399 |
| 2002/0013232 A1 * | 1/2002 | Kinoshita et al. | 508/364 |
| 2003/0139302 A1 | 7/2003 | Akada | |

FOREIGN PATENT DOCUMENTS

| | | |
|---|---|---|
| JP | 9-87649 | 3/1997 |
| JP | 9-125082 | 5/1997 |
| JP | 9-194871 | 7/1997 |
| JP | 9-324190 | 12/1997 |
| JP | 11-61168 | 3/1999 |
| JP | 3320598 | 6/2002 |
| JP | 2003-155491 | 5/2003 |
| JP | 2003-183687 | 7/2003 |
| WO | WO 99/02629 | 8/2006 |

OTHER PUBLICATIONS

Fish, "Constant Velocity Joint Greases", GKN Technology Limited-Wolverhampton United Kingdom at the 9$^{th}$ ELGI Annual General Meeting in Berlin, Eurogrease May/Jun. 1997.
Chinese Official Action dated Aug. 1, 2008, issued in counterpart Chinese Application No. 2005800056491 with English translation.
EP Search Report issued for European Patent Application No. 05719596.8-210411724328, dated Sep. 28, 2010.

* cited by examiner

*Primary Examiner* — Jim Goloboy
(74) *Attorney, Agent, or Firm* — Nixon & Vanderhye P.C.

(57) ABSTRACT

The present invention provides a grease composition for use in a constant velocity joint, which is excellent in the resistance to flaking. The grease composition comprises the following components (a) to (d):
(a) a base oil; (b) a thickener; (c) an organic molybdenum compound; and (d) at least one compound selected from the group consisting of oxides of divalent typical metals having a Mohs hardness lower than that of the steel and compounds of the foregoing divalent typical metals, which can immediately be converted into the corresponding oxides of these metals having a Mohs hardness lower than that of the steel under the boundary lubrication conditions. In particular, the present invention relates to a grease composition for use in a constant velocity joint, wherein the component (d) is zinc oxide or zinc carbonate and wherein the component (c) is molybdenum dithiocarbamate.

7 Claims, No Drawings

GREASE COMPOSITION FOR USE IN CONSTANT VELOCITY JOINT AND CONSTANT VELOCITY JOINT

This is a continuation application of PCT/JP2005/003268, filed 28 Feb. 2005, which claimed priority of JP 2004-053735, filed 27 Feb. 2004, the entire contents of both of which are incorporated herein by reference.

TECHNICAL FIELD

The present invention relates to a grease composition for use in constant velocity joints (hereafter also referred to as "CVJ") and a constant velocity joint. More specifically, the present invention relates to a grease composition for CVJ, which can lubricate the CVJ to effectively reduce wear of joints and to effectively reduce occurrence of flaking in the parts to be lubricated.

BACKGROUND ART

In CVJ, stresses are repeatedly applied to the balls thereof and the surface of metals which are brought into close contact with the balls, due to complicated reciprocating motions with rolling and sliding observed under a high contact pressure during the rolling motions thereof and accordingly, a problem arises such that the CVJ is quite liable to cause a flaking phenomenon due to fatigue of metals.

Examples of conventionally used grease compositions for use in CVJs include lithium soap thickened extreme-pressure grease compositions comprising molybdenum disulfide; lithium soap thickened extreme-pressure grease compositions comprising molybdenum disulfide and sulfur-phosphorus extreme-pressure agent or lead naphthenate (see, for instance, Non-patent Document 1 specified below).

Furthermore, Patent Document 1 also discloses a grease composition which comprises at least one member selected from the group consisting of divalent typical metal oxides having a Mohs hardness lower than that of the steel and compounds of the foregoing divalent typical metals, which can immediately be converted into the corresponding oxides of these metals having a Mohs hardness lower than that of the steel under the boundary lubrication conditions.

Patent Document 2 discloses a grease composition for use in constant velocity joints, which comprises a urea thickener, molybdenum disulfide, a calcium salt such as that of oxidized wax or that of sulfonic acid, and molybdenum dithiocarbamate.

Patent Document 3 discloses a grease composition for use in constant velocity joints, which comprises a urea thickener, an organic molybdenum compound such as molybdenum-dithiocarbamate or molybdenum dithiophosphate, and a calcium salt such as that of oxidized wax or that of sulfonic acid.

However, these grease compositions for CVJs are not necessarily satisfied when they are used under such severe operating conditions generated in the recent high-performance motorcars because of the following reasons.

The cross-groove type joint and the double offset type joint used as the plunging type constant velocity joint as well as the bar field type joint used as the fixed type constant velocity joint have a structure in which six balls in general transmit torque.

On the other hand, the load applied onto the balls or the area which comes in contact with the same has been increased due to the miniaturization of the size of the CVJ along with the recent weight-reduction of the motorcar. Such an increase in the load is one of the reasons why the joint would easily undergo flaking phenomena. If the balls or the contact area undergo such flaking, it would be difficult to smoothly transmit torques through the joint and therefore, this becomes a cause of vibrations, noises and abnormal sounds of motorcars. As has been discussed above, the size of the CVJ has been reduced along with the miniaturization of the motorcars and accordingly, the resulting contact pressure would relatively be increased. For this reason, the conventional grease compositions cannot satisfactorily control or eliminate the occurrence of the foregoing flaking phenomenon.

Patent Document 1: JP-A-2003-183687;
Patent Document 2: JP-A-Hei 9-194871;
Patent Document 3: JP-A-Hei 9-324190;
Non-Patent Document 1: Fish, G., Constant Velocity Joint Greases, Euro Grease, 1997, May/June, 25.

DISCLOSURE OF THE INVENTION

Problems That the Invention is to Solve

Accordingly, it is an object of the present invention to provide a grease composition for use in a constant velocity joint, which is excellent in the resistance to flaking.

It is another object of the present invention to provide a constant velocity joint containing the foregoing grease composition filled therein.

Means for Solving the Problems

The inventors of this invention have conducted various studies to make the wearing characteristics of a constant velocity joint optimum and to thus prevent the occurrence of flaking of the joint due to abnormal wear and fatigue of metals. The performance of the greases used under the lubrication conditions, which accompany the foregoing complicated reciprocating motions with rolling and sliding observed under a high contact pressure, is evaluated using a vibration-friction wear tester called SRV (Schwingung Reibung und Verschleiss) tester while taking note of, in particular, the sliding motions to thus investigate the lubricating characteristics (the diameters of wearing marks formed on balls) of such greases using various kinds of extreme pressure additives, solid lubricants or a variety of combinations of additives. As a result, the inventors of this invention have found that a grease composition which comprises a specific combination of ingredients including a base oil, a thickener, an organic molybdenum compound and an oxide of a divalent typical metal and optionally a molybdenum dithiocarbamate show lubricating characteristics quite desirable for the reduction of wear and the inventors have further confirmed that these grease compositions can prevent the occurrence of flaking phenomenon even in the durability-evaluation test using a real constant velocity joint, unlike conventional greases for constant velocity joints and have thus completed the present invention.

According to the present invention, there are herein provided the following grease compositions for CVJ and constant velocity joints:

1. A grease composition for constant velocity joints comprising the following components (a) to (d):
   (a) a base oil;
   (b) a thickener;
   (c) an organic molybdenum compound; and
   (d) at least one compound selected from the group consisting of oxides of divalent typical metals having a Mohs hardness lower than that of the steel and compounds of the foregoing divalent typical metals, which can immediately be converted into the corresponding oxides of these metals having a Mohs hardness lower than that of the steel under the boundary lubrication conditions.
2. The grease composition as set forth in the foregoing item 1, wherein the component (d) is zinc oxide.
3. The grease composition as set forth in the foregoing item 1 or 2, wherein the component (c) is molybdenum dithiocarbamate.
4. The grease composition as set forth in any one of the foregoing items 1 to 3, wherein the component (b) is a urea thickener.
5. The grease composition as set forth in the foregoing item 1, wherein it comprises, on the basis of the total mass of the grease composition, 50 to 98% by mass of the base oil as the component (a); 1 to 40% by mass of the thickener as the component (b); 0.1 to 10% by mass of the organic molybdenum compound as the component (c); and 0.1 to 10% by mass of the oxide of divalent typical metal or the compound which can immediately be converted into the corresponding oxide under the boundary lubrication conditions as the component (d).
6. The grease composition as set forth in the foregoing item 1, wherein it comprises, on the basis of the total mass of the grease composition, 70 to 98% by mass of the base oil as the component (a); 1 to 25% by mass of the urea thickener as the component (b); 0.5 to 5% by mass of molybdenum dithiocarbamate as the component (c); and 0.1 to 5% by mass of zinc oxide or zinc carbonate as the component (d).
7. A constant velocity joint comprising a grease composition filled therein and as set forth in any one of the foregoing items 1 to 6.

Effect of the Invention

The constant velocity joint comprising a grease composition according to the present invention filled therein is excellent in the resistance to flaking.

BEST MODE FOR CARRYING OUT THE INVENTION

The base oil as the component (a) used in the grease composition of the present invention is not restricted to any particular ones. It may be, for instance, all sort of base oils not to speak of mineral oils. In addition to mineral oils, specific examples of the base oils usable herein include a variety of synthetic oils such as ester type synthetic oils such as diesters and polyol esters; synthetic hydrocarbon oils such as poly (α-olefin) and polybutene; ether type synthetic oils such as alkyl diphenyl ethers and polypropylene glycols; silicone oils; and fluorinated oils.

The thickener as the component (b) used in the grease composition of the present invention is not likewise limited to any specific ones. Specific examples thereof preferably used herein are soap type thickeners such as Li soaps and Li complex soaps; urea thickeners such as diurea; inorganic thickeners such as clay modified with organic substances and silica; and organic thickeners such as PTFE, with the urea thickeners being particularly preferably used herein.

Recently, there have frequently been used grease compositions comprising a urea thickener in the applications in which good flaking resistance is required. It is supposed that this is due to the protection of the rolling plane with the urea compound and accordingly, the use of a urea thickener in the present invention would further permit the considerable improvement of the flaking resistance. In addition, the urea thickener has few disadvantages, is relatively cheap and is highly practical as compared with other thickeners.

As such urea thickeners usable in the present invention, there may be listed, for instance, diurea compounds and polyurea compounds.

The diurea compound can be prepared by, for instance, a reaction of a diisocyanate with a monoamine. Examples of diisocyanates include phenylene diisocyanate, diphenyl diisocyanate, phenyl diisocyanate, diphenylmethane diisocyanate, octadecane diisocyanate, decane diisocyanate and hexane diisocyanate. Examples of such monoamines are octylamine, dodecylamine, hexadecylamine, octadecylamine, oleylamine, aniline, p-toluidine, and cyclohexylamine.

Such a polyurea compound can be obtained by, for instance, a reaction of a diisocyanate with a diamine. Examples of such diisocyanates are the same as those listed above in connection with the preparation of the foregoing diurea compounds and examples of such diamines are ethylenediamine, propanediamine, butanediamine, hexanediamine, octanediamine, phenylenediamine, tolylenediamine and xylenediamine.

Particularly preferred urea thickeners are diurea compounds obtained through the reaction of diisocyanate compounds with aliphatic amines such as octylamine and stearylamine; aromatic amines such as aniline and p-toluidine; cyclohexylamine; or any combination thereof.

The content of the thickener in the grease composition of the present invention may vary depending on the kinds of thickeners selected. The penetration of the grease composition of the present invention preferably ranges from 200 to 400 and therefore, the content of the thickener should be set at a level required for satisfying this requirement for the penetration. The content of the thickener in the grease composition of the present invention in general ranges from 3 to 30% by mass and preferably 5 to 25% by mass.

Examples of the organic molybdenum compound used as the component (c) in the grease composition of the present invention are molybdenum dithiophosphates and molybdenum dithiocarbamates.

Preferred examples of the foregoing molybdenum dithiophosphates include those represented by the following general formula:

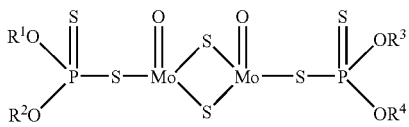

In the formula, each of $R^1$, $R^2$, $R^3$ and $R^4$ independently represents an alkyl group having 1 to 24 and preferably 3 to 20 carbon atoms or an aryl group having 6 to 30 and preferably 8 to 18 carbon atoms.

Preferred examples of the foregoing molybdenum dithiocarbamates include those represented by the following general formula:

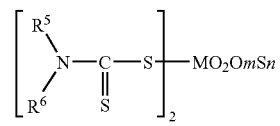

In the formula, each of $R^5$ and $R^6$ independently represents an alkyl group having 1 to 24 and preferably 3 to 20 carbon atoms; m ranges from 0 to 3 and n ranges from 4 to 1, provided that the sum of m and n is 4 (m+n=4).

The organic molybdenum compounds preferably used as the component (c) in the grease composition of the present invention are molybdenum dithiocarbamates, with those represented by the foregoing general formula being particularly preferably used herein.

The content of the component (c) present in the grease composition of the present invention preferably ranges from 0.1 to 10% by mass and more preferably 0.5 to 5% by mass. If the component is used in an amount of less than 0.1% by mass, the resulting effect is insufficient, while if it is used in an amount of greater than 10% by mass, there is not observed any further improvement of the desired effect.

Examples of the component (d) or the oxide of a divalent typical metal having a Mohs hardness lower than that of the steel (hereafter also referred to as the "oxide(s) of the present invention") include the oxides thereof having a Mohs hardness of not more than 8, preferably not more than 5 and more preferably 3 to 5.

More specific examples thereof are oxides represented by the formula: MO (in this formula, M represents Ca, Zn, Pb, Ba, Sr, Cd, Be, Mn, Ra, Sn or Hg) and compound oxides thereof. The Mohs hardness of steel as a member to be lubricated ranges from 5 to 8 and specific examples of metal oxides, whose Mohs hardness is smaller than that falling within the range, include CaO (4 to 4.5), ZnO (4 to 5), PbO (2), SrO (3.5), CdO (3), BaO (3), ZnO—PbO, and ZnO—SrO, but the present invention is not restricted to these specific examples at all. In this respect, the numerical values given in parentheses represent the Mohs hardness of the corresponding oxides. Zinc oxide is particularly preferably used herein.

As the compounds of the foregoing divalent typical metals, which can immediately be converted into the corresponding oxides of these metals having a Mohs hardness lower than that of the steel under the boundary lubrication conditions, there may be listed, for instance, carbonates. In this respect, the term "boundary lubrication condition(s)" herein used means "the lubrication conditions under which the surfaces of two kinds of metallic members are directly brought into contact with one another to thus make the formation of an oil film difficult" and further the term "immediately" likewise used herein means that "the metal is converted into the corresponding oxide before an oxide layer is not yet formed on the fresh surface exposed through the friction between the two kinds of metallic members".

Examples of carbonates of divalent typical metals (hereafter also referred to as the "carbonate(s) of the present invention") include those represented by the formula: $MCO_3$ (in the formula, M represents Ca, Zn, Pb, Ba, Sr, Cd, Be, Mn, Ra, Sn or Hg). Specific examples thereof include $CaCO_3$, $ZnCO_3$, $PbCO_3$, $SrCO_3$, $BaCO_3$, and $CdCO_3$, but the present invention is not restricted to these specific examples at all. Particularly preferably used herein is zinc carbonate.

The oxides of the present invention and the compounds capable of being immediately converted into the corresponding oxides under the boundary lubrication conditions may be used in any combination of at least two of them.

The incorporation, into the grease, of the oxide of the present invention and/or the compound capable of being immediately converted into the corresponding oxide under the boundary lubrication conditions, for instance, a carbonate permits the effective inhibition of the occurrence of flaking at lubricated portions.

The content of the at least one compound selected from the group consisting of oxides of divalent typical metals having a Mohs hardness lower than that of the steel and compounds which can immediately be converted into the corresponding oxides under the boundary lubrication conditions preferably ranges from 0.1 to 10% by mass and more preferably 0.1 to 5% by mass. If this component is used in an amount of less than 0.1% by mass, the resulting effect is insufficient, while if it is used in an amount of greater than 10% by mass, there is not observed any further improvement of the desired effect.

The grease composition for use in constant velocity joints according to the present invention preferably comprises, on the basis of the total mass of the grease composition, 50 to 98% by mass of the base oil as the component (a); 1 to 40% by mass of the thickener as the component (b); 0.1 to 10% by mass of the organic molybdenum compound as the component (c); and 0.1 to 10% by mass of the oxide of divalent typical metal or the compound which can immediately be converted into the corresponding oxide under the boundary lubrication conditions as the component (d).

The grease composition for use in constant velocity joints according to the present invention more preferably comprises, on the basis of the total mass of the grease composition, 70 to 98% by mass of the base oil as the component (a); 1 to 25% by mass of the urea thickener as the component (b); 0.5 to 5% by mass of molybdenum dithiocarbamate as the component (c); and 0.1 to 5% by mass of zinc oxide or zinc carbonate as the component (d).

It is preferred that the grease composition of the present invention further comprises vulcanized fats and oils. Examples of such vulcanized fats and oils are sulfur-crosslinked polymers, vulcanized fatty acid esters, and mixtures thereof and the amount thereof to be incorporated into the grease composition preferably ranges from 0.1 to 15% by mass and more preferably 0.2 to 10% by mass.

Preferably, the grease composition of the present invention further comprises molybdenum disulfide. The amount thereof to be incorporated into the grease composition preferably ranges from 0.1 to 15% by mass and more preferably 0.2 to 10% by mass.

Preferably, the grease composition of the present invention further comprises a calcium salt such as a calcium salt of sulfonic acid, or a calcium salt of oxidized wax. Examples of such calcium salts of sulfonic acids, and calcium salts of oxidized waxes include, for instance, calcium salts of synthetic sulfonic acid such as calcium salts of petroleum sulfonic acids obtained by the sulfonation of the aromatic hydrocarbon moieties present in lubricant cuts, alkyl aromatic sulfonates such as dinonylnaphthalene sulfonates and alkylbenzene sulfonates; overbasic calcium salts of petroleum sulfonic acids, overbasic calcium salts of alkyl aromatic sulfonic acids, calcium salts of oxidized waxes, and overbasic calcium salts of oxidized waxes. Particularly preferably used herein include calcium salts of alkyl aromatic sulfonic acids and calcium salts of oxidized waxes. The amount thereof to be incorporated into the grease composition preferably ranges from 0.1 to 15% by mass and more preferably 0.2 to 10% by mass.

The grease composition of the present invention may if necessary comprise various kinds of additives. Examples of such additives include an antioxidant, a rust preventive, a metal corrosion-inhibitory agent, an oiliness improver, a wear-resistant agent, an extreme pressure agent, and/or a solid lubricant.

The lubricant composition of the present invention can easily be prepared by admixing the foregoing components and other additives in desired mixing rates.

EXAMPLES

Examples 1 to 5 and Comparative Examples 1 to 5, 7 to 11 and 13

Preparation of Base Urea Grease

There was introduced, into a container, 400 g of a base oil and then 250 g (1 mole) of diphenylmethane-4,4'-diisocyanate was reacted with 129 g (1 mole) of octylamine and 270 g (1 mole) of octadecylamine in the base oil, followed by the uniform dispersion of the resulting urea compound in the base oil to thus form a base grease.

The additives specified in the following Tables 1 to 3 were added to the resulting base grease in mixing rates likewise specified in these tables, followed by the appropriate addition of the base oil and the adjustment of the penetration of the resulting mixture to a level of JIS Penetration of 300, using a 3-stage roll mill.

Examples 6 to 8 and Comparative Examples 6, 12, and 14 to 16

Preparation of Base Lithium Grease

There was introduced, into a container, 2500 g of a base oil and 500 g of 12-hydroxy stearic acid and the resulting mixture was heated to 80° C. To the heated mixture, there was added 140 g of a 50% lithium hydroxide aqueous solution with stirring, followed by stirring the mixture for 30 minutes to saponify the same and the subsequent heating of the mixture up to 210° C. After the heating, the mixture was cooled down to 160° C., 1930 g of the base oil was further added to the mixture and the resulting mixture was then cooled to a temperature of not more than 100° C. with stirring to thus give a base lithium grease.

The additives specified in the following Tables 1 to 3 were added to the resulting base grease in mixing rates likewise specified in these tables, followed by the appropriate addition of the base oil and the adjustment of the penetration of the resulting mixture to a level of JIS Penetration of 300, using a 3-stage roll mill.

The following base oil was used in all of the foregoing Examples and Comparative Examples:

| Kind of Base Oil: | Mineral Oil; |
|---|---|
| Viscosity Values: | 130 mm$^2$/s (as determined at 40° C.); and 14 mm$^2$/s (as determined at 100° C.); |
| Viscosity Index: | 106. |

Moreover, a commercially available lithium grease containing molybdenum disulfide was used as the grease of Comparative Example 17.

The vulcanized fat and oil (A) used in these Examples or Comparative Examples is a vulcanized fatty acid ester (commercially available from KING INDUSTRIES, Inc. under the trade name of NALUBE EP5210) and the vulcanized fat and oil (B) used these Examples is a sulfur-crosslinked polymer (commercially available from Rheinchemie Corporation under the trade name of ADDITIN RC8000).

These greases were inspected for physical properties according to the following test methods and the results thus obtained are likewise summarized in the following Tables 1 to 3.

| <SRV Test> | | |
|---|---|---|
| Test Piece: | Ball having a diameter of 10 mm (SUJ-2) | |
| | Cylindrical plate of 24 mm (diameter) × 7.85 mm (SUJ-2) | |
| | Surface Roughness: Ra = 1.0 μm | |
| Evaluation Conditions: | Load: | 200 N |
| | Frequency: | 50 Hz |
| | Amplitude: | 3 mm |
| | Time: | 30 minutes |
| | Test Temp.: | 40° C. |

Measured and Observed Items: The diameters of wear marks observed on the balls are determined after the completion of these tests to thus observe the wear surface states of the balls. In this respect, the diameters of wear marks are expressed in millimeters (mm). The wear surface state is evaluated on the basis of the following criteria:

○: There is not any scratch mark or defect on the ball surface; and x: There are observed scratch marks or defects on the ball surface.

<Test for Durability in Actual Use>

Bench test for durability is carried out using real joints under the following conditions to thus examine on whether the joints undergo any defect such as flaking or not:

| Test Conditions: | Number of Revolution: | 200 rpm; |
|---|---|---|
| | Torque: | 785 N · m; |
| | Angle of Joint: | 7 degrees; |
| | Operation Time: | Time required for the generation of flaking; |
| | Type of Joint: | Cross Groove Joint |

Measured Items: Occurrence of flaking at given portions of each joint observed after the operation.

It is needless to say that the time (h) required for the generation of flaking is desirably longer, but the time is suitably at least 500 hours from the viewpoint of the practical use thereof.

<Four-Ball EP Test>

This test is carried out according to ASTM D 2596. Using steel balls each having a diameter of ½ in, three out of these four steel balls are fixed to a sample container and a sample grease is filled in the container. The remaining rotating steel ball is pressed against these fixed balls at the center thereof to thus bring the rotating ball into close contact with the fixed balls at three points and the ball is rotated at a rotational speed of 1770 rpm for 10 seconds while applying a predetermined load to the ball. The test balls and sample grease are replaced at every time, and the foregoing operations are repeated while increasing the load to be applied till the test balls undergo welding to thus determine the load at which the balls cause welding (Weld Point). In this test, the loads used were 1589, 1961, 2452, 3089 and 3923 N, respectively. The weld point in this four-ball EP test is desirably not less than 2452 N from the viewpoint of the practical use thereof.

TABLE 1

| | Ex. No. | | | | | | | |
|---|---|---|---|---|---|---|---|---|
| | 1 | 2 | 3 | 4 | 5 | 6 | 7 | 8 |
| Diurea grease | 95.70 | 94.70 | 96.20 | 97.20 | 98.20 | | | |
| Li Grease | | | | | | 98.20 | 97.80 | 98.00 |
| MoDTC | 1.50 | 1.50 | 1.50 | 1.50 | 1.50 | 1.50 | 1.50 | 1.20 |
| Zinc oxide | 0.30 | 0.30 | 0.30 | 0.30 | 0.30 | 0.30 | 0.20 | 0.30 |
| Vulcanized fat and oil (A) | | | | | | | 0.50 | 0.50 |
| Vulcanized fat and oil (B) | 0.50 | 0.50 | 1.00 | 1.00 | | | | |
| $MoS_2$ | 1.00 | 1.00 | 1.00 | | | | | |
| Ca Sulfonate | 1.00 | | | | | | | |
| Ca Oxidized Wax | | 2.00 | | | | | | |
| D (mm) of wear marks[1] | 0.62 | 0.57 | 0.59 | 0.56 | 0.56 | 0.58 | 0.56 | 0.57 |
| Wear State[2] | ○ | ○ | ○ | ○ | ○ | ○ | ○ | ○ |
| Weld P. (N)[3] | 3089 | 3089 | 3089 | 2452 | 2452 | 2452 | 3089 | 3089 |
| Dur. (h)[4] | 750< | 680 | 570 | — | — | — | 750< | — |

[1] The diameter (mm) of wear marks observed on the surface of the balls in the SRV test.
[2] The wear state observed on the surface of the balls in the SRV test.
[3] The weld point (Weld P.) (N) observed for each sample in the four-ball EP test.
[4] The results obtained in the foregoing test for the durability in actual use.

TABLE 2

| | Comp. Ex. No. | | | | | | | |
|---|---|---|---|---|---|---|---|---|
| | 1 | 2 | 3 | 4 | 5 | 6 | 7 | 8 |
| Diurea grease | 97.20 | 96.20 | 97.70 | 98.70 | 99.70 | | 96.00 | 95.00 |
| Li Grease | | | | | | 99.70 | | |
| MoDTC | | | | | | | 1.50 | 1.50 |
| Zinc oxide | 0.30 | 0.30 | 0.30 | 0.30 | 0.30 | 0.30 | | |
| Vulcanized fat and oil (B) | 0.50 | 0.50 | 1.00 | 1.00 | | | 0.50 | 0.50 |
| $MoS_2$ | 1.00 | 1.00 | 1.00 | | | | 1.00 | 1.00 |
| Ca Sulfonate | 1.00 | | | | | | 1.00 | |
| Ca Oxidized Wax | | 2.00 | | | | | | 2.00 |
| D (mm) of wear marks[1] | Seizure | Seizure | Seizure | Seizure | Seizure | Seizure | 0.56 | 0.68 |
| Wear State[2] | Seizure | Seizure | Seizure | Seizure | Seizure | Seizure | X | X |
| Weld P. (N)[3] | 2452 | 2452 | 2452 | 1961 | 1589 | 1589 | 3089 | 3089 |
| Dur. (h)[4] | — | — | — | — | — | — | — | — |

TABLE 3

| | Ex. No. | | | | | | | | |
|---|---|---|---|---|---|---|---|---|---|
| | 9 | 10 | 11 | 12 | 13 | 14 | 15 | 16 | 17 |
| Diurea grease | 96.50 | 97.50 | 98.50 | | 99.00 | | | | |
| Li Grease | | | | 98.50 | | 98.30 | 97.80 | 98.30 | |
| MoDTC | 1.50 | 1.50 | 1.50 | 1.50 | | 1.20 | 1.20 | 1.20 | |
| Zinc oxide | | | | | | | | | |
| Vulcanized fat and oil (A) | | | | | | 0.50 | 1.00 | | |
| Vulcanized fat and oil (B) | 1.00 | 1.00 | | | 1.00 | | | 0.50 | |
| $MoS_2$ | 1.00 | | | | | | | | |
| Ca Sulfonate | | | | | | | | | |
| Ca Oxidized Wax | | | | | | | | | |
| D (mm) of wear marks[1] | 0.68 | Seizure | 0.57 | 0.57 | Seizure | 0.59 | 0.65 | 0.78 | 0.75 |
| Wear State[2] | X | Seizure | ○ | X | Seizure | ○ | X | ○ | X |
| Weld P. (N)[3] | 3089 | 2452 | 1961 | 1961 | 1961 | 1961 | 3089 | 3089 | 3923 |
| Dur. (h)[4] | — | — | — | — | — | — | — | — | 400 |

The foregoing data listed in Tables clearly indicate that the grease compositions prepared in Examples 1 to 8 of the present invention, which comprise the components (a) to (d), have small diameters of wear marks observed on the surface of the balls in the SRV test; that they do not have any scratch on the wear surface of the balls; that they have weld points of not less than 2452 N in the four-ball EP test; and that they have durability over a long period of time even in the test for the durability in actual use.

Contrary to this, the grease compositions of Comparative Examples 1 to 6, whose compositions corresponded to those of the compositions of Examples 1 to 6, respectively except that they were free of any component (c), caused seizure during the SRV test.

The grease composition of Comparative Example 7, whose composition corresponded to that of the composition of Example 1 except that the composition was free of any component (d), had a small diameter of wear marks observed on the surface of the balls in the SRV test, but there were observed scratches on the wear surface of the balls.

As to the grease compositions of Comparative Examples 8 to 9, whose compositions corresponded to those of the compositions of Examples 2 to 3, respectively, except that the compositions were free of any component (d), there were observed scratches or defects on the wear surface of the balls used in the SRV test.

The grease composition of Comparative Example 10, whose composition corresponded to that of the composition of Example 4 except that the composition was free of any component (d), caused seizure during the SRV test.

The grease composition of Comparative Example 11, whose composition corresponded to that of the composition of Example 5 except that the composition was free of any component (d), had small diameters of wear marks observed on the surface of the balls in the SRV test and the composition did not have any scratch on the wear surface of the balls, but it had a weld point of less than 2452 N in the four-ball EP test.

The grease composition of Comparative Example 12, whose composition corresponded to that of the composition of Example 6 except that the composition was free of any component (d), had a small diameter of wear marks observed on the surface of the balls in the SRV test, but there were observed scratches on the wear surface of the balls.

The grease composition of Comparative Example 13, whose composition corresponded to that of the composition of Example 4 except that the composition was free of any component (c) and any component (d), caused seizure during the SRV test.

The grease composition of Comparative Example 14, whose composition corresponded to that of the composition of Example 8 except that the composition was free of any component (d), had small diameters of wear marks observed on the surface of the balls in the SRV test and the composition did not have any scratch on the wear surface of the balls, but it had a weld point of less than 2452 N in the four-ball EP test.

The grease composition of Comparative Example 15, whose composition corresponded to that of the composition of Comparative Example 14 except that the amount of the vulcanized fat and oil (A) was doubled, had scratch on the wear surface of the balls used in the SRV test.

The grease composition of Comparative Example 16, whose composition corresponded to that of the composition of Comparative Example 14 except that the vulcanized fat and oil (B) was substituted for the vulcanized fat and oil (A), had large diameters of wear marks observed on the surface of the balls in the SRV test.

What is claimed is:

1. A grease composition for constant velocity joints comprising the following components (a) to (d):
    (a) a base oil;
    (b) a thickener;
    (c) molybdenum dithiocarbamate; and
    (d) zinc oxide,
    wherein the grease composition comprises, on the basis of the total mass of the grease composition, 70 to 98% by mass of the base oil as the component (a); 5 to 25% by mass of the thickener as the component (b); 0.5 to 5% by mass of the molybdenum dithiocarbamate as the component (c); and 0.1 to 5% by mass of zinc oxide as the component (d), wherein a penetration of the grease composition ranges from 200 to 400, and
    wherein the thickener is selected from the group consisting of soap-type thickeners and urea thickeners.

2. The grease composition as set forth in claim 1, wherein the component (b) is a urea thickener.

3. A constant velocity joint wherein the grease composition as set forth in claim 1 is filled.

4. A constant velocity joint wherein the grease composition as set forth in claim 2 is filled.

5. The grease composition as set forth in claim 1, wherein the component (b) comprises a lithium soap.

6. A constant velocity joint wherein the grease composition as set forth in claim 5 is filled.

7. The grease composition for constant velocity joints according to claim 1, wherein the grease composition comprises, on the basis of the total mass of the grease composition, about 70 to about 98% by mass of the base oil as the component (a); about 5 to about 8% by mass of the thickener as the component (b); about 1 to about 2% by mass of the molybdenum dithiocarbamate as the component (c); and about 0.1 to about 0.5% by mass of zinc oxide as the component (d), wherein a penetration of the grease composition ranges from 200 to 400, and
    wherein the thickener is selected from the group consisting of soap-type thickeners and urea thickeners.

* * * * *